(12) United States Patent
Stewart (10) Patent No.: US 7,764,177 B2
(45) Date of Patent: Jul. 27, 2010

(54) INDUCTIVELY COUPLED EXTENSION ANTENNA FOR A RADIO FREQUENCY IDENTIFICATION READER

(75) Inventor: Robert Stewart, Boulder, CO (US)

(73) Assignee: Allflex USA, Inc., DFW Airport, TX (US)

( * ) Notice: Subject to any disclaimer, the term of this patent is extended or adjusted under 35 U.S.C. 154(b) by 188 days.

(21) Appl. No.: 11/825,970

(22) Filed: Jul. 10, 2007

(65) Prior Publication Data

US 2009/0015383 A1  Jan. 15, 2009

(51) Int. Cl.
*G08B 13/14* (2006.01)
(52) U.S. Cl. ............... 340/572.7; 340/572.1; 340/10.1; 340/10.3
(58) Field of Classification Search ... 340/572.7–572.8, 340/10.1, 10.3; 343/700 MS
See application file for complete search history.

(56) References Cited

U.S. PATENT DOCUMENTS

| | | | |
|---|---|---|---|
| 1,744,036 A | 1/1930 | Brard | |
| 2,379,800 A | 7/1945 | Hare | |
| 3,299,424 A | 1/1967 | Vinding | |
| 3,713,148 A | 1/1973 | Cardullo et al. | |
| 5,053,774 A | 10/1991 | Schuermann et al. | |
| 6,169,483 B1 | 1/2001 | Ghaffari et al. | |
| 6,329,920 B1 | 12/2001 | Morrison et al. | |
| 6,346,885 B1 * | 2/2002 | Curkendall | 340/572.4 |
| 6,839,035 B1 * | 1/2005 | Addonisio et al. | 340/572.1 |
| 7,151,455 B2 | 12/2006 | Lindsay et al. | |
| 7,432,817 B2 * | 10/2008 | Phipps et al. | 340/572.7 |
| 7,460,018 B2 * | 12/2008 | Kubo | 340/572.7 |
| 7,541,930 B2 * | 6/2009 | Saarisalo et al. | 340/572.7 |
| 2005/0080636 A1 | 4/2005 | Markwitz et al. | |
| 2005/0099306 A1 | 5/2005 | Gilfix et al. | |
| 2005/0146472 A1 | 7/2005 | Ihara et al. | |
| 2005/0168385 A1 | 8/2005 | Baker | |
| 2005/0208889 A1 | 9/2005 | Baker et al. | |

(Continued)

OTHER PUBLICATIONS

Finkenzeller, "Components of an RFID System", RFID Handbook Radio-Frequency Identification Fundamentals and Applications, 1999, 5 pgs.

(Continued)

*Primary Examiner*—Eric M Blount
(74) *Attorney, Agent, or Firm*—Kauth, Pomeroy, Peck & Bailey LLP (57) ABSTRACT

Systems and methods are described for adapting a portable RFID reader to create a portable RFID reader assembly that includes an extension antenna. In many embodiments, the extension antenna can be added to increase the reach of the portable RFID reader. The extension antenna is inductively coupled to the portable RFID reader and in many embodiments, the extension antenna is retrofit to an existing portable RFID reader. In other embodiments, a portable RFID reader and one or more extension antennas are produced as part of a set. One embodiment of the invention includes a reader having reader circuitry configured to generate an activation signal, a first antenna, where the first antenna is electrically connected to the reader circuitry, a reader housing containing the reader circuitry, an extension antenna including an elongated housing, a second antenna located at one end of the housing, and a third antenna located at the opposite end of the housing, where the second antenna is electrically connected to the third antenna. In addition, the first antenna and second antenna are inductively coupled.

27 Claims, 4 Drawing Sheets

Mechanical Connection

U.S. PATENT DOCUMENTS

| | | |
|---|---|---|
| 2006/0208899 A1* | 9/2006 | Suzuki et al. ............ 340/572.7 |
| 2007/0008140 A1* | 1/2007 | Saarisalo et al. ......... 340/572.7 |
| 2007/0008152 A1 | 1/2007 | Parias |
| 2007/0023517 A1 | 2/2007 | Tan et al. |
| 2007/0171073 A1 | 7/2007 | Ariyoshi et al. |
| 2007/0222603 A1* | 9/2007 | Lai et al. ................. 340/572.7 |
| 2008/0068173 A1 | 3/2008 | Alexis et al. |
| 2008/0252426 A1 | 10/2008 | Lee et al. |

OTHER PUBLICATIONS

International Search Report for International Application PCT/US 2007/15738 filed Jul. 10, 2007; report completed Feb. 25, 2008; mailed Mar. 17, 2008; 5 pgs.

Written Opinion for International Application PCT/US2007/15738 filed Jul. 10, 2007; report completed Feb. 25, 2008; mailed Mar. 17, 2008; 7 pgs.

* cited by examiner

Fig. 4 Portable RFID Reader
*Prior Art*

Fig. 5
*Prior Art*

Fig. 6 Inductively Coupled Extension Antenna

Fig. 7a Inductively Coupled Extension Antenna

Fig. 7b Wiring Configuration

Fig. 8  Ferrite Antenna 800

Fig. 9  Mechanical Connection

INDUCTIVELY COUPLED EXTENSION ANTENNA FOR A RADIO FREQUENCY IDENTIFICATION READER

FIELD OF THE INVENTION

This invention, relates to radio frequency identification (RFID) systems and, more particularly, to an RFID reader that uses a resonant frequency antenna circuit that magnetically couples with electronic identification tags that carry information in the form of digital data.

BACKGROUND

Passive low frequency RFID readers and tags use operating principles that are well-know to those of ordinary skill in the art, and that are described in extensive detail in several seminal inventions, including U.S. Pat. No. 1,744,036 to Brard, U.S. Pat. No. 3,299,424 to Vinding, U.S. Pat. No. 3,713,148 to Cardullo et al., and U.S. Pat. No. 5,053,774 to Schuermann et al., and in textbooks such as Finkenzeller, "RFID Handbook" (1$^{st}$ Edition, 1999). The disclosure of U.S. Pat. Nos. 1,744,036, 3,299,424, 3,713,148 and 5,053,774 and the "RFID Handbook" is incorporated herein by reference in its entirety In RFID systems of this type, the reader (also sometimes referred to as a scanner or interrogator) device generates a tag activation signal, and receives identification data signals from the electronic identification (EID) tag. Such a reader device can use separate transmit and receive antenna elements to perform these functions. Readers in which a single antenna performs both transmit and receive functions are typically economical and efficient, and are commonly used in low-frequency RFID reader designs.

Figure 1:
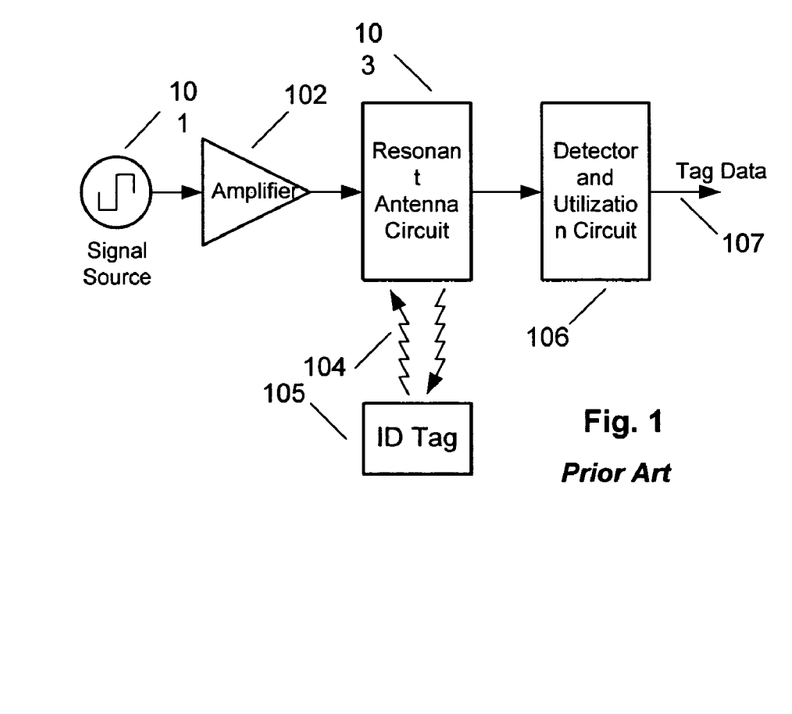
FIG. 1 illustrates the basic components and operation of a conventional radio frequency identification (RFID) system that uses passive electronic identification (EID) tags.

An example of the circuitry of a conventional RFID system capable of reading EID tags is shown in FIG. 1. The reader includes circuitry, which generates an activation signal (usually a single frequency unmodulated signal) using a signal source 101 and an amplifier 102 to drive a resonant antenna circuit 103. This activation signal manifests as a time-varying electromagnetic field, which couples with the EID tag 105 by means of the electromagnetic field's magnetic field component 104. The EID tag 105 converts this magnetic field into an electrical voltage and current, and uses this electrical power to activate its internal electronic circuitry. Using any of several possible modulation schemes, the EID tag conveys binary encoded information stored within it back to the reader via magnetic field 104, where the detector and utilization circuit 106 converts this binary code into alphanumeric format tag data 107 in accordance with some prescribed application.

Figure 2:
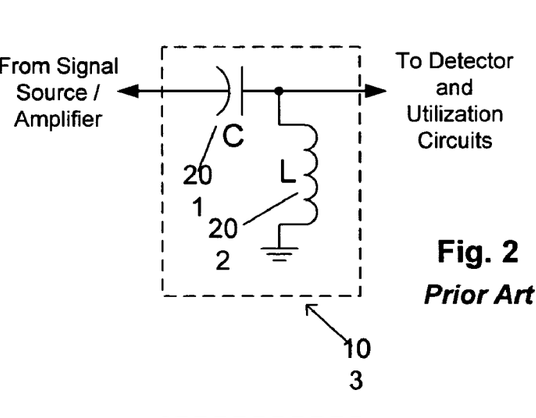
FIG. 2 illustrates the inductive and capacitive components comprising the resonant antenna circuit shown as part of FIG. 1.
Figure 3:
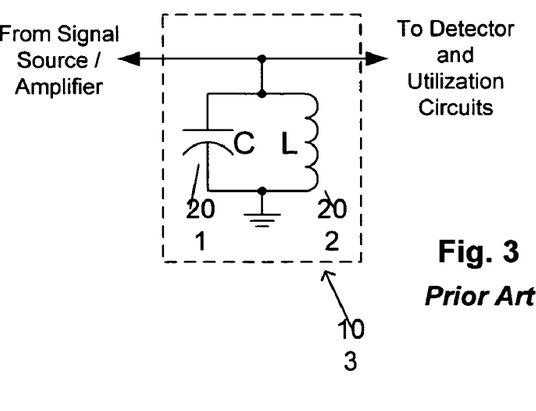
FIG. 3 shows an alternate wiring arrangement for the components in FIG. 2.

The resonant antenna circuit 103 in FIG. 1 typically includes at least one inductive and one capacitive circuit element. Examples of resonant antenna circuits are shown in FIGS. 2 and 3. In each circuit, the capacitive element 201 is connected to the inductive element 202. Functionally, the inductive element 202 radiates a magnetic field when driven by a time varying signal. Conversely, when exposed to a time varying magnetic field, current flow is induced in the inductive element 202, resulting in a time varying signal that appears at the resonant antenna circuit's connection points. These phenomena are well known to be consistent with a principle of physics known as Faraday's Law.

FIG. 2 illustrates a series-wired arrangement of the inductor 202 and capacitor 201, and FIG. 3 illustrates a parallel-wired arrangement of these same components. Either arrangement may be used in an RFID reader depending on other design attributes, such as the configuration of Amplifier 102 and/or the Detector and Utilization Circuit 106. In either case, the selection of inductor and capacitor values are determined by the equation $F_R = 1/2\pi\sqrt{LC}$, which is well known to those of ordinary skill in the art. For example, if the capacitance C of the capacitor 201 is 5 nF (i.e., $5 \times 10^{-9}$ Farads) and the inductance L of the inductor 202 is 281 uH (i.e., $281 \times 10^{-6}$ Henries), then the resonant frequency is expected to be 134.27 kilohertz (KHz). A variety of values for L and C can be combined to produce a particular resonant frequency $F_R$, and the selection of specific values generally depends on other design considerations.

Figure 4:
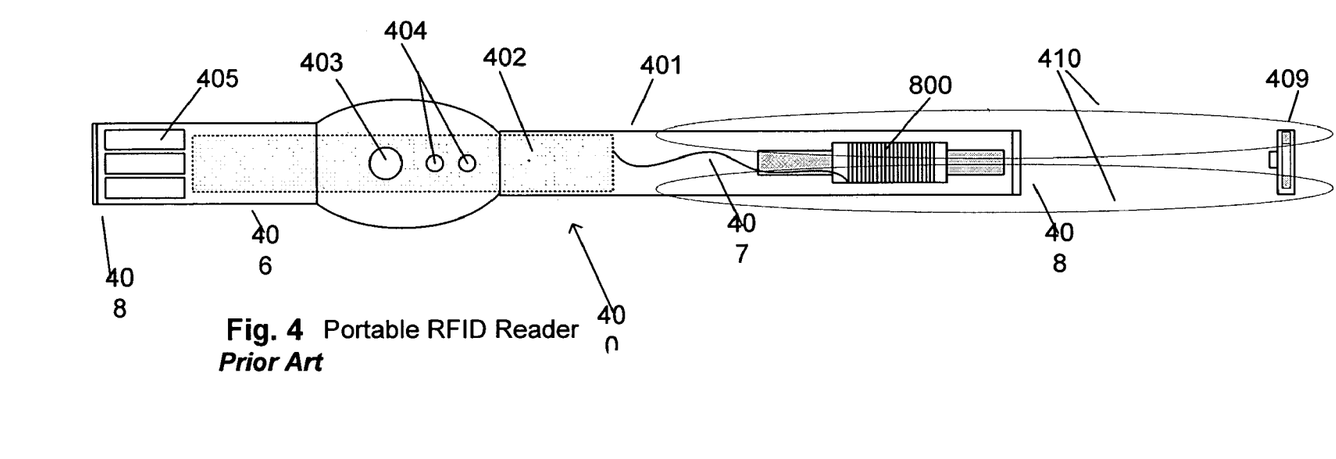
FIG. 4 illustrates a cutaway view of a typical portable reader device, highlighting the reader's principle functional components, and the coupling of the reader's antenna to an EID tag.

The packaging of an RFID reader can be important to the usefulness of the reader. Many RFI) readers are packaged for static mounting on a wall or in other fixed locations. Other types of readers are transportable in that they are stationary during use and easily moved for use where needed. Still other types of RFID readers are packaged as portable devices to be used to manually read EID tags. FIG. 4 illustrates in cutaway view a typical portable RFID reader 400 that could be used in a variety of possible EID tag reading applications. This RFID reader includes a non-metallic enclosure housing 401 having a handle grip 406, and which encloses the reader components, including a ferrite antenna 800, the reader's electronic circuitry 402, a battery power source 405, an activation switch 403, indicator lights 404, and antenna connecting wires 407. Each end of the RFID reader's packaging is sealed with an end cap 408. The RFID reader 400 includes a capacitor similar to the capacitor 201 shown in FIG. 2 as part of its electronic circuitry 402.

FIG. 4 also illustrates a typical EID tag 409 and an RFID reader 400. The EID tag 409 is shown oriented with respect to a ferrite antenna 800 of the RFID reader in a way that is optimal for activation and reading. The ellipses depicted by the dashed lines 410 are indicative of a magnetic field coupling the ferrite antenna 800 with the EID tag 409. The magnetic field conveys an activation signal to the EID tag 409 and a data signal to the ferrite antenna 800.

Figure 5:
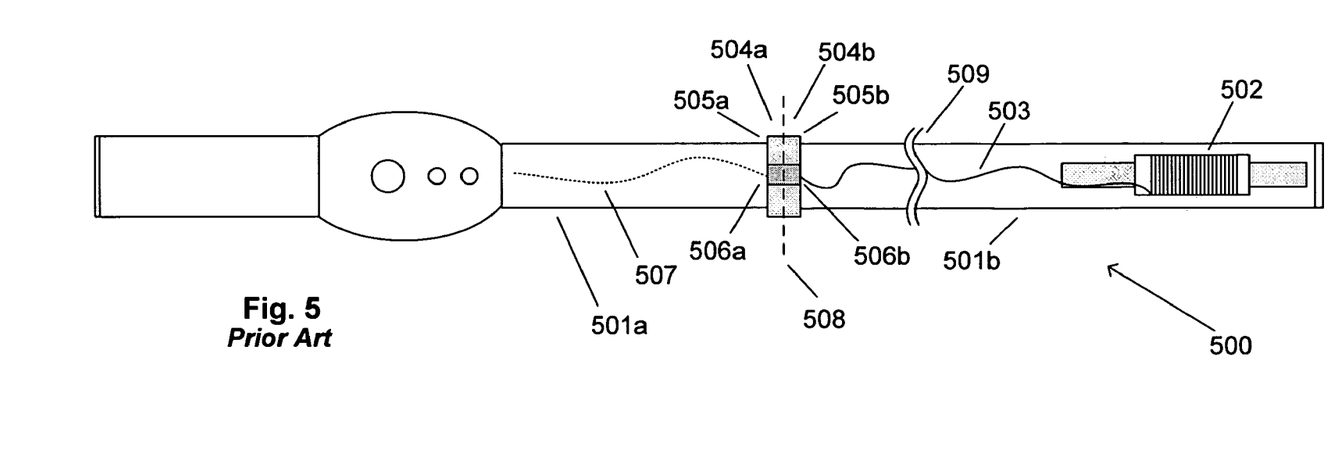
FIG. 5 illustrates a portable RFID reader configured to connect with various length extension antennas in the manner known in the prior art.

In many applications, providing antenna extensions to vary the length of a portable RFID reader can enhance the usefulness of the portable RFID reader. FIG. 5 illustrates a portable RFID reader that can be combined with various antenna extensions to vary the RFID reader's antenna length. The portable RFID reader 500 includes an RFID reader base 501$a$ and one or more antenna extensions 501$b$. The RFID reader base 501$a$ and an antenna extension 501$b$ combine together to form a complete portable RFID reader. Although not shown in FIG. 5, the RFID reader base 501$a$ includes all the components of the reader 400 shown in FIG. 4, except that the RFID reader base 501$a$ does not contain an antenna. Instead, the end of the RFID reader base 501$a$ is equipped with an electromechanical coupler 504$a$, which includes a mechanical joining mechanism 505$a$ and an electrical connector 506$a$. The electrical connecter 506$a$ has wiring 507 that electrically connects the connector 506$a$ to the reader's electronic circuitry.

The antenna extension 501 contains a ferrite antenna 502 whose electrical wires 503 are routed through the enclosure to electrical connector 506$b$. Connector 506$b$ is part of electromechanical coupler 504$b$, which also includes mechanical joining mechanism 505$b$. Electromechanical coupler 504$a$ is designed to electrically and mechanically mate with electromechanical coupler 504$b$, such that electrical connector 506$a$ mates with electrical connector 506$b$, and the mechanical joining devices 505$a$, 505$b$ also mate at junction point 508. The antenna extension 501 can be any length that is of practicable use. The electromechanical couplers 504$a$, 504$b$ are illustrated conceptually rather than in detail, inasmuch as many variants of the same coupling principle can and do exist, but all function to a greater or lesser extent as described above.

Although the reader antenna extension shown in FIG. 5 and described above is functional, the electromechanical coupler can be expensive and is prone to electrical and mechanical fatigue and failure. The electromechanical coupler can also require alignment of mating parts, a task that can be difficult to perform and which can impart damage to the associated components if executed incorrectly. The electromechanical coupler can also become contaminated with foreign debris, which can damage the coupler's integrity and impair its functionality. In addition, the reader assembly must be specially equipped with the electromechanical coupler, differentiating it from a standard reader that has an integral antenna.

SUMMARY OF THE INVENTION

Systems and methods are described for providing a portable RFID reader and one or more extension antennas. The extension antennas can be inductively coupled to the antenna of the portable RFID reader, to increase the length of the RFID reader's antenna. A feature of many embodiments of the invention is that they do not include exposed electrical connector contacts. The lack of exposed electrical contacts reduces the incidence of damage and failure, and allows both the reader and the extension antenna to be easily hermetically sealed from the environment. In a number of embodiments of the invention, the mechanical joining mechanism used to couple the antenna extension to the portable RFID reader is greatly simplified inasmuch as it lacks an integral electrical connector. Extension antennas in accordance with embodiments of the present invention can be retrofitted with existing portable readers, thus providing owners of such readers extended antenna capability, without requiring them to purchase a specially designed reader having an electromechanical coupler and lacking an integral antenna.

One embodiment of the invention includes a reader having reader circuitry configured to generate an activation signal, a first antenna, where the first antenna is electrically connected to the reader circuitry, a reader housing containing the reader circuitry, an extension antenna including an elongated housing, a second antenna located at one end of the housing, and a third antenna located at the opposite end of the housing, where the second antenna is electrically connected to the third antenna. In addition, the first antenna and second antenna are inductively coupled.

In a further embodiment, the reader circuitry is configured to generate an activation signal that causes the first antenna to generate a time varying magnetic field.

In another embodiment, the reader includes a pushbutton switch and the reader circuitry is configured to generate the activation signal in response to the pushbutton switch being pressed.

In a still further embodiment, the first antenna and the second antenna are configured so that the second antenna generates a time varying electrical signal on the electrical connection between the second antenna and the third antenna that is indicative of a time varying magnetic field generated by the first antenna and the third antenna is configured to generate a time varying magnetic field indicative of a time varying electrical signal received via the electrical connection between the second antenna and the third antenna.

In still another embodiment, the third antenna is configured to receive information data from an electronic identification tag.

In a yet further embodiment, the third antenna is configured to generate an electrical signal indicative of the received information data and to provide the electrical signal to the second antenna via the electrical connection between the third antenna and the second antenna, the second antenna is configured to generate a magnetic field indicative of an electrical signal generated by the third antenna, the first antenna is configured to generate an electrical signal indicative of the magnetic field generated by the second antenna and to provide the electrical signal to the reader circuitry via the electrical connection between the first antenna and the reader circuitry and the reader circuitry is configured to determine the received information data from the electrical signal received from the first antenna.

In yet another embodiment, at least one of the antennas is a ferrite antenna.

In a further embodiment again, the ferrite antenna includes a ferrite core, an insulating form surrounding a portion of the ferrite core and a coil wrapped around the insulating form.

In another embodiment again, the ferrite core has a circular geometry,

In a further additional embodiment, all of the antennas are ferrite antennas.

In another additional embodiment, all of the ferrite antennas include a circular geometry, have the same cross-section geometry and include the same number of turns.

In a still yet further embodiment, at least one of the antennas is an air core antenna.

In still yet another embodiment, the inductor within at least one of the antennas is connected in parallel with a capacitor.

In a still further embodiment again, the electrical connection between the second antenna and the third antenna includes at least two electrical conductors.

In still another embodiment again, the elongated housing is constructed from a non-metallic material.

A still further additional embodiment also includes a mechanical joining mechanism that connects the extension antenna to the reader and aligns the first inductor and the second inductor.

In still another additional embodiment, the first antenna and second antenna have circular cross sections, the housing of the reader includes a circular portion axially aligned with the circular cross section of the first antenna, the elongated housing has a circular cross section, the circular cross section of the second antenna and the elongated housing are axially aligned, and the mechanical joining mechanism is configured to attach to the circular portion of the reader housing and to the elongated housing so that that first and second antennas are axially aligned.

In a yet further embodiment again, the mechanical joining mechanism also includes a coupling sleeve configured to engage the elongated housing of the extension antenna, a split collar configured to engage the housing of the portable reader and a cinching band configured to tighten the split collar.

In yet another embodiment again, the mechanical joining mechanism is integral with the elongated housing of the extension antenna.

In a yet further additional embodiment, the mechanical joining mechanism is integral with the housing of the portable reader.

Yet another additional embodiment also includes a handle connected to the mechanical joining mechanism.

In a further additional embodiment again, the reader housing contains the ferrite antenna.

In another additional embodiment again, the ferrite antenna is connected to the reader housing via a cable.

Another further embodiment includes a first resonant antenna circuit, a second resonant antenna circuit, an electrical interconnection between the first and second resonant antenna circuits, and an elongated housing containing the first and second antenna circuits and the electrical interconnection. In addition, the first resonant antenna circuit is located at one end of the elongated housing and the second resonant antenna circuit is located at the opposite end of the elongated housing.

In another further embodiment again, the first and second resonant antenna circuit include ferrite antennas.

In another further additional embodiment, the first and second resonant antenna circuits include the same inductors, the same capacitors, and the same inductor and capacitor wiring configuration.

In still another further embodiment, the first and second resonant antenna circuits have a circular cross-section geometry and the elongated housing has a circular cross-section geometry.

An embodiment of the method of the invention includes generating a time varying electrical signal, generating a time varying magnetic field indicative of the time varying electrical signal, detecting the time varying magnetic field, generating a second time varying electrical signal indicative of the detected magnetic field, generating a second time varying magnetic field indicative of the second time varying electrical signal and activating the electronic identification tag using the second time varying magnetic field.

A further embodiment of the method of the invention includes detecting a magnetic field indicative of the identification data, generating an electrical signal indicative of the detected magnetic field, generating a second magnetic field that is indicative of the electrical signal, detecting the second magnetic field, generating a second electrical signal indicative of the detected second magnetic field, and extracting the identification data from the second electrical signal.

BRIEF DESCRIPTION OF THE DRAWINGS

FIG. 7b illustrates the electrical wiring of the arrangement shown in FIG. 7a.

DETAILED DESCRIPTION OF THE INVENTION

Turning now to the drawings, portable RFID reader assemblies in accordance with embodiments of the invention are shown that include a portable RFID reader inductively coupled and, in several embodiments physically connected, to an extension antenna. In a number of embodiments, the portable RFID reader is a conventional reader including a resonant antenna and the extension antenna includes a pair of resonant antennas that are electrically connected. In many embodiments, a mechanical joining mechanism attaches the portable RFID reader to the extension antenna and the resonant antenna in the portable RFID reader is inductively coupled to one of the resonant antennas in the extension antenna.

Figure 6:
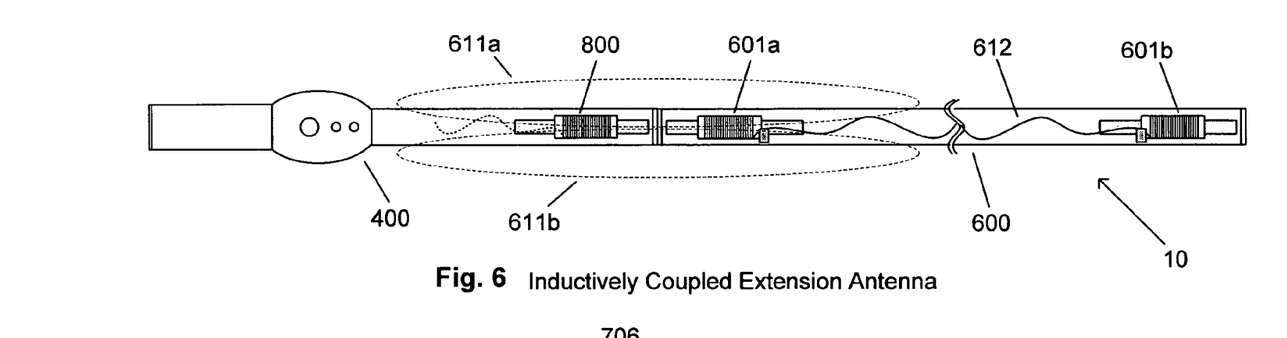
FIG. 6 illustrates an RFID reader including an extension antenna inductively coupled to the RFID reader base in accordance with an embodiment of the invention.

An embodiment of an RFID reader assembly including an RFID reader inductively coupled to an extension antenna in accordance with an embodiment of the invention is shown in FIG. 6. The composite RFID reader assembly 10 includes a portable RFID reader 400 closely located to an extension antenna 600. The portable RFID reader 400 is similar to the portable RFID reader 400 shown in FIG. 4 and includes a ferrite antenna 800. The extension antenna 600 includes two ferrite antennas 601a, 601b that are connected via an electrical connection 612. The dashed lines 611a, 611b conceptually illustrate the inductive coupling between the ferrite antenna 800 in the portable RFID reader 400 and one of the ferrite resonant antennas 601a in the extension antenna 600. In many embodiments, the cross-section geometry of the reader 400 and the extension antenna 600 is circular, as are the antennas 800, 601a, and 601b. Consequently, there is no need for rotational alignment as there typically is with the electromechanical coupler 504a, 504b of the prior art. However, in, other embodiments, the cross-section geometries of the portable RFID reader and the extension antenna may be dissimilar and alignment is achieved using an indexed or keyed coupling method. Although the embodiment shown in FIG: 6 includes a ferrite antenna 800 contained within the housing of the portable RFID reader, in other embodiments a ferrite antenna is connected by a cable to a portable RFID reader. In several embodiments, the RFID reader is fixed and the ferrite antenna and the cable connecting the ferrite antenna to the RFID reader are portable. In other embodiments, the RFID reader is stationary during operation and can be moved for use in different locations.

In many embodiments, the portable RFID reader used to form the portable RFID reader assembly is constructed to resemble a wand that is held in one hand, pointed at an EID tag, and activated for tag reading by pressing a pushbutton switch. When the pushbutton switch is pressed, an activation signal is applied by the reader's electronic circuitry 402 to the ferrite antenna 800 causing a time varying magnetic field to radiate in the vicinity of the ferrite antenna 800. The inductive coupling between the ferrite antenna 800 in the portable RFID reader and the ferrite resonant antenna 601a located within the end of the extension antenna that is proximate (and in some instances physically connected to) the portable RFID reader causes the ferrite resonant antenna 601a to generate an electrical signal on the electrical connection 612. The electrical signal, when input to the ferrite resonant antenna 601b, causes the ferrite resonant antenna 601b to generate a time varying magnetic field similar to the time varying magnetic field originally generated by the ferrite antenna 800 in the portable RFID reader. When an EID tag is sufficiently close to the ferrite resonant antenna 601b, the EID tag becomes activated and provides its information data using any one of many possible schemes to the reader. The ferrite resonant antenna 601b captures the tag's data signal. The captured data signal is conveyed from the ferrite resonant antenna 601b to the portable RFID reader via the electrical connection 612 and the inductive coupling between the ferrite resonant antenna 601a in the extension antenna and the ferrite antenna 800 in the portable RFID reader. The portable RFID reader is able to process the tag's data signal in ways that result in the reproduction of the tag's data information. In a number of portable RFID readers, the tag's information data can be (a) displayed on an integral readout, (b) stored internally for later access, (c) conveyed by cable or by wireless means to another recording device, or can be processed in several of these or other additional manners. In addition to being able to read a tag in the manner described immediately above, the reader 400 retains its ability to read a tag using its integral antenna 800 while the extension antenna 600 is physically attached to and inductively coupled with reader 400. Having two tag reading points can have advantages in some configurations and applications.

The portable RFID reader 400 can have a variety of shapes, sizes, and physical features that facilitate its use for a specific application. In a typical embodiment, the portable RFID reader is cylindrical in shape, having a cross sectional dimension that is typically 30 millimeters (mm) and a length that is typically between 30 centimeters (cm) and 75 cm. The ferrite antenna 800 is typically located at the end opposite the end where the handle and user interface are located, thus allowing the wand shape to be held in one hand by the user and pointed at an EID tag, thereby minimizing the distance between the ferrite antenna 800 and the EID tag 409 that is being scanned. In several embodiments, a-portable RFID reader is used that was specifically designed for use as part of a set with one or more extension antennas. In other embodiments, the extension antennas are designed for retrofit to portable RFID readers that were not originally designed for use with an extension antenna.

Figure 7A:
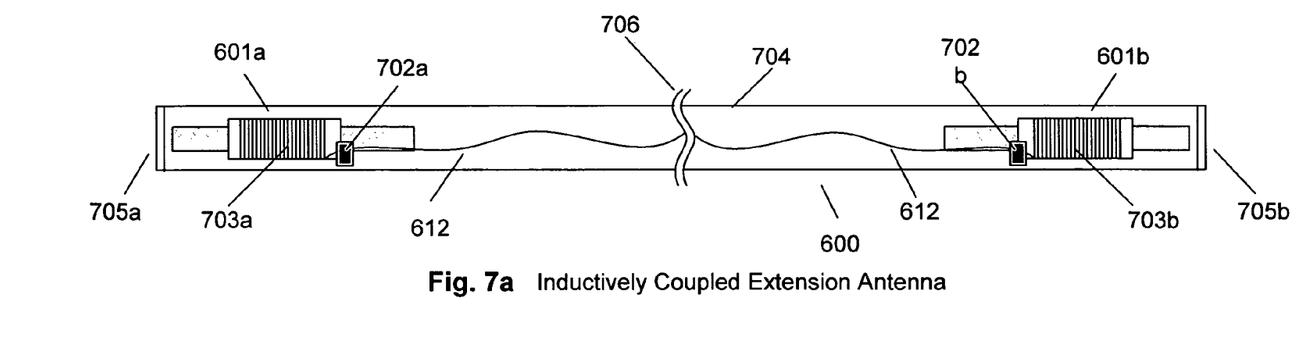
FIG. 7a illustrates an antenna extension in accordance with an embodiment of the invention.

An extension antenna in accordance with an embodiment of the invention is shown in FIG. 7a. The extension antenna 600 includes a non-metallic enclosure 704 that houses two ferrite resonant antennas 601a, 601b at opposite ends of the enclosure. As is indicated by the broken lines 706, the enclosure has no specific length, and can be established at any length that is appropriate and optimum for the application and the user. Each end of the enclosure is equipped with an end cap 705a, 705b which seals the enclosure hermetically. Preferably, the enclosure 704 is of the same cross sectional shape and size, and is composed of the same material as the housing of a portable RFID reader with which the extension antenna can mechanically couple.

Included in each ferrite resonant antenna 601a, 601b are capacitors 702a, 702b and ferrite inductors 703a, 703b. In the preferred embodiment, the capacitors 702a, 702b are connected with the ferrite inductors 703a, 703b to form the ferrite resonant antennas 601a, 601b in accordance with the parallel wiring scheme shown in FIG. 3. The inductor and capacitor values are determined by the resonant frequency equation, $F_R = 1/2\pi\sqrt{LC}$, where $F_R$ is the frequency used for activating the EID tag. Other configurations for the capacitors are possible—for example, a single capacitor having a value equal to the sum of the two separate capacitors could be used. However, embodiments comprising two inductor and capacitor sets have the advantage of allowing each inductor and capacitor set to be individually tuned to frequency $F_R$ and then paired with any other tuned ferrite antenna and capacitor set to comprise the configuration shown in FIG. 7a.

Figure 7B:
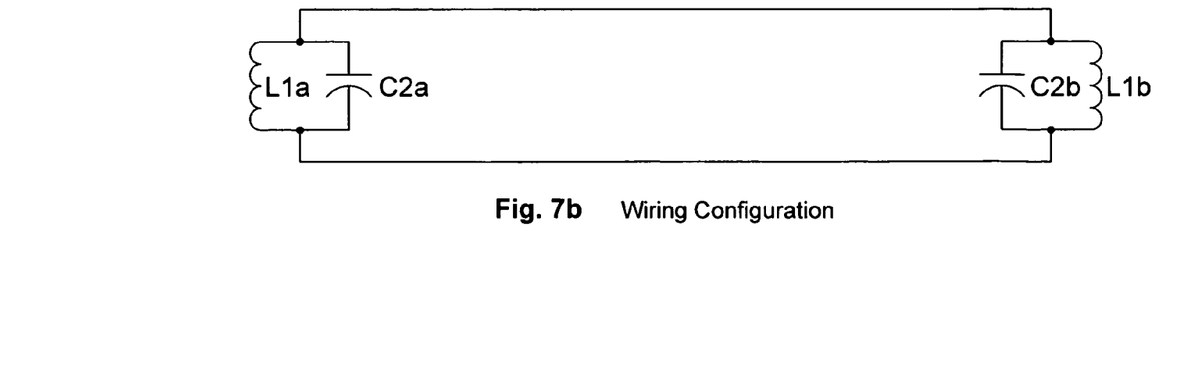

FIG. 7b illustrates the wiring configuration for the ferrite resonant antennas in an antenna extension in accordance with an embodiment of the invention. In FIG. 7b, components L1a, C2a, L1b, and C2b correspond to the components, 703a, 702a, 703b and 702b, respectively, and the two lines connection L1a/C2a to L1b/C2b is the electrical conductor pair 612 in FIG. 7a.

The extension antennas described above assume that the ferrite resonant antennas 601a, 601b are spatially separated such that they do not experience mutual inductance effects. However, even with the incidence of mutual inductance that may result from closely spacing the ferrite resonant antennas 601a, 601b, the extension antenna's operation and utility sustains. The operation and utility of the extension antenna can also be enhanced by altering the tuning and polarization matching of the ferrite resonant antennas 601a, 601b.

Figure 8:
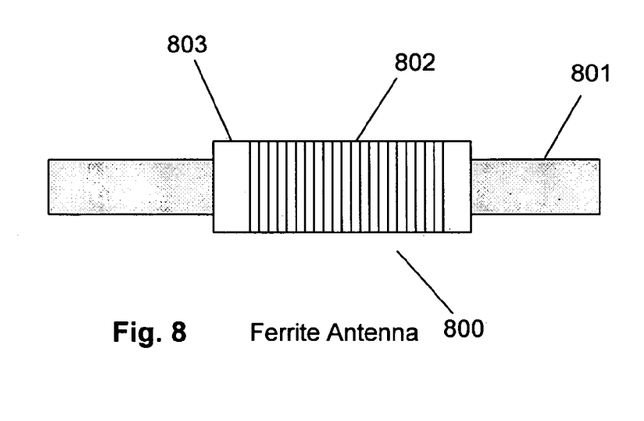
FIG. 8 illustrates the composition and arrangement of a ferrite core antenna for inclusion in an antenna extension in accordance with an embodiment of the invention.

A ferrite inductor that can be used in a ferrite antenna in an extension antenna in accordance with an embodiment of the invention is shown in FIG. 8. The ferrite antenna inductor 800 includes a wire 802 wound on a ferrite core 801, the combination is often referred to as a "ferrite core antenna". The ferrite core 801 in this example has a cylindrical geometry, but could alternately have a rectangular cross sectional geometry or another type of geometry. Multiple turns of wire 802 are wound on an insulator form 803, and the coil most frequently has two electrical connections, one at each end of the wire turns. Ferrite-core antennas are highly effective in compact short-range RFID readers inasmuch as the ferrite core accentuates the inductance value and concentrates the pattern of the radiated magnetic field. Furthermore, the inductance value can be adjusted by shifting the position of the coil 802 wound on the insulator form 803 relative to the ferrite core 801. Through this, the resonant antenna circuit be easily tuned to the precise $F_R$ value for a specific application, and such tuning optimizes the antenna's performance. Obviously, the coil 802 can be wound directly on the ferrite core 801 if there is no necessity in a particular application for adjusting the inductance value, or if the inductance value is to be adjusted by altering the number of wire turns 802 on the ferrite core 801.

Although the antenna inductors described above are ferrite core, many embodiments of the invention utilize antenna inductors that are constructed using multiple turns of wire (which can have any imaginable geometric shape) wound on a dielectric core or bobbin, the core or bobbin having no influence on the resulting inductance value. Such an antenna inductor is often referred to as an "air-core antenna".

Referring back to FIG. 6, many embodiments of the invention include extension antennas having ferrite resonant antennas 601a, 601b that are identical components, and furthermore are identical to the ferrite antenna 800 in the portable RFID reader with which the extension antenna is designed to couple. However, this need not be the case, and each of the resonant antennas can be comprised of different component values, different component shapes and sizes, and even different constructions. For example, an inductive coupling can be achieved with the ferrite antenna 800 in the portable RFID reader using a ferrite antenna comprising turns of wiring that circumscribe the ferrite antenna 800.

In the embodiment illustrated in FIG. 6, the extension antenna 600 has its ferrite resonant antenna 601a aligned axially with the reader's ferrite antenna 800. In practice, with the ferrite antennas so aligned and separated by not more than 1 to 2 centimeters, coupling efficiency can achieve at least 80%. While this efficiency has the practical reality of reducing the effective reading distance of the RFID reader assembly relative to that of the portable RFID reader, the addition of the extension antenna to the portable RFID reader allows the ferrite resonant antenna 601b to approach the target EID tag much closer physically than would be possible without the extension antenna, and so this slight loss in read range turns out to be not critical in most applications.

Figure 9:
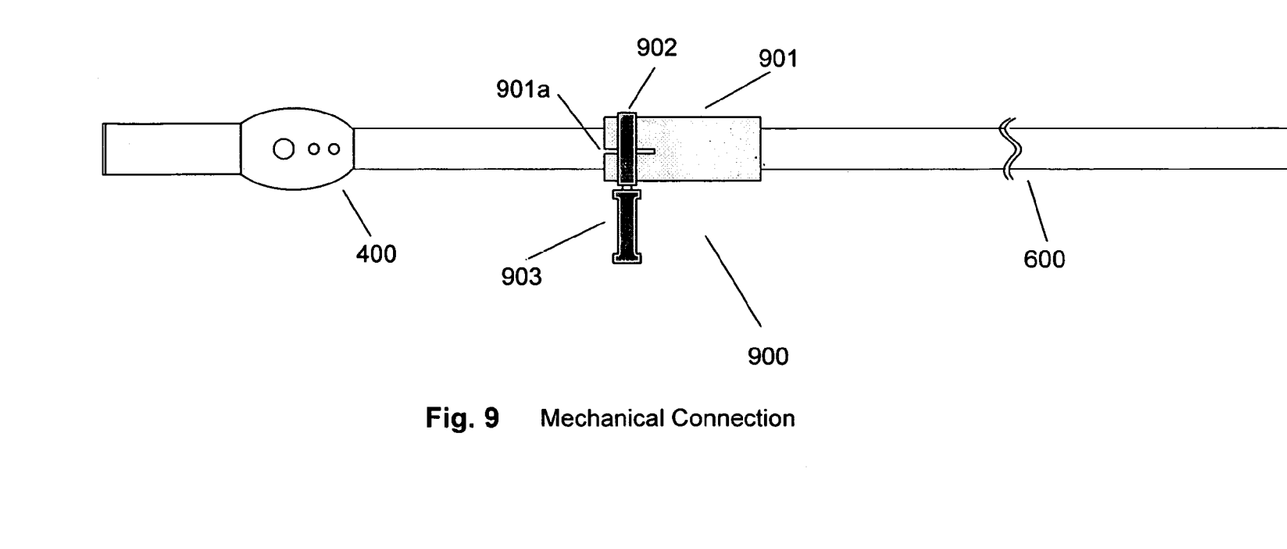
FIG. 9 illustrates an extension antenna mechanically joined to a RFID reader base in accordance with an embodiment of the invention.

Turning now to FIG. 9, a portable RFID reader assembly including a simple mechanical joining mechanism 900 for attaching an extension antenna 600 to an RFID reader 400 is shown. The mechanical joining mechanism 900 includes a connecting sleeve 901 constructed from some suitable non-metallic material into which the extension antenna 600 is inserted and preferably bonded permanently, such that the extension antenna includes the mechanical joining mechanism 900 as an integral part thereof. The portion of the connecting sleeve 901 that attaches to the RFID reader 400 preferably has a split collar 901a design that allows easy insertion and removal of the reader 400. The mechanical joining mechanism 900 is equipped with a cinching band 902, also preferably non-metallic, which through means of reducing the cinching band diameter, the split collar 901a is tightened around the diameter of the reader 400 enclosure, and thereby provides a mechanically solid and sound assembly. An ancillary handle 903 can be added to allow for two-hand gripping of the composite reader and extension antenna assembly. In many embodiments, the ancillary handle 903 provides the required mechanical action that constricts the cinching band 902. Although a split collar and cinching band are described above, in many embodiments other types of mechanical joining mechanisms are used to fix an extension antenna to a portable RFID reader. In a number of embodiments, the mechanical joining mechanism is an integral part of the housing of the RFID reader.

While the above description contains many specific embodiments of the invention, these should not be construed as limitations on the scope of the invention, but rather as an example of one embodiment thereof. For example, while many of the embodiments described above include a portable RFID reader having a ferrite core antenna, the invention can be adapted for use with portable RFID readers having air-core antennas, and to stationary readers. Accordingly, the scope of the invention should be determined not by the embodiments illustrated, but by the appended claims and their equivalents.

What is claimed is:

1. A radio frequency identification reader assembly, comprising:
   a portable reader, including:
      reader circuitry configured to generate an activation signal;
      a first antenna, where the first antenna is electrically connected to the reader circuitry; and
      a reader housing containing the reader circuitry and the first antenna;
   an extension antenna including:
      an elongated housing;
      a second antenna located at one end of the housing; and
      a third antenna located at the opposite end of the housing, where the second antenna is electrically connected to the third antenna; and
      a mechanical coupler configured to fix one end of the elongated housing of the extension antenna to the housing of the portable reader, wherein the first antenna and second antenna are inductively coupled when the extension antenna is fixed to the housing of the portable reader by the mechanical coupler.

2. The radio frequency identification reader assembly of claim 1, wherein the reader circuitry is configured to generate an activation signal that causes the first antenna to generate a time varying magnetic field.

3. The radio frequency identification reader assembly of claim 2, wherein:
   the first antenna and the second antenna are configured so that the second antenna generates a time varying electrical signal on the electrical connection between the second antenna and the third antenna that is indicative of a time varying magnetic field generated by the first antenna; and
   the third antenna is configured to generate a time varying magnetic field indicative of a time varying electrical signal received via the electrical connection between the second antenna and the third antenna.

4. The radio frequency identification reader assembly of claim 1, wherein the third antenna is configured to receive information data from an electronic identification tag.

5. The radio frequency identification reader assembly of claim 4, wherein:
   the third antenna is configured to generate an electrical signal indicative of the received information data and to provide the electrical signal to the second antenna via the electrical connection between the third antenna and the second antenna;
   the second antenna is configured to generate a magnetic field indicative of an electrical signal generated by the third antenna;
   the first antenna is configured to generate an electrical signal indicative of the magnetic field generated by the second antenna and to provide the electrical signal to the reader circuitry via the electrical connection between the first antenna and the reader circuitry; and
   the reader circuitry is configured to determine the received information data from the electrical signal received from the first antenna.

6. The radio frequency identification reader assembly of claim 1, wherein at least one of the antennas is a ferrite antenna.

7. The radio frequency identification reader assembly of claim 1, wherein all of the antennas are ferrite antennas.

8. The radio frequency identification reader assembly of claim 7, wherein all of the ferrite antennas include a circular geometry, have the same cross-section geometry and include the same number of turns.

9. The radio frequency identification reader assembly of claim 1, wherein at least one of the antennas is an air core antenna.

10. The radio frequency identification reader assembly of claim 1, wherein the inductor within at least one of the antennas is connected in parallel with a capacitor.

11. The radio frequency identification reader assembly of claim 1, wherein the electrical connection between the second antenna and the third antenna includes at least two electrical conductors.

12. The radio frequency identification reader assembly of claim 1, wherein the elongated housing is constructed from a non-metallic material.

13. The radio frequency identification reader assembly of claim 1, wherein:
   the first and second antenna are ferrite antennas; and
   the mechanical coupler that fixes the extension antenna to the housing of the reader axially aligns the first antenna and the second antenna.

14. The radio frequency identification reader assembly of claim 13, wherein:
   the first antenna and second antenna have circular cross sections;
   the housing of the reader includes a circular portion axially aligned with the circular cross section of the first antenna;
   the elongated housing has a circular cross section;

the circular cross section of the second antenna and the elongated housing are axially aligned; and the mechanical coupler is configured to join the elongated housing of the extension antenna to the portable reader so that the circular portion of the reader housing and the elongated housing are axially aligned.

15. The radio frequency identification reader assembly of claim 13, wherein the mechanical coupler, comprises:
a coupling sleeve configured to engage the elongated housing of the extension antenna;
a split collar configured to engage the housing of the portable reader; and
a cinching band configured to tighten the split collar.

16. The radio frequency identification reader assembly of claim 13, wherein the mechanical coupler is integral with the elongated housing of the extension antenna.

17. The radio frequency identification reader assembly of claim 13, wherein the mechanical coupler is integral with the housing of the portable reader.

18. The radio frequency identification reader assembly of claim 13, further comprising a handle connected to the mechanical coupler.

19. The radio frequency identification reader assembly of claim 1, wherein the reader housing contains a ferrite antenna.

20. An extension antenna, comprising:
a first resonant antenna circuit;
a second resonant antenna circuit;
an electrical interconnection between the first and second resonant antenna circuits; and
an elongated housing containing the first and second antenna circuits and the electrical interconnection;
wherein the elongated housing is configured to be fixed to a housing of a portable RFID reader by a mechanical coupler;
wherein the first resonant antenna circuit is located at one end of the elongated housing; and
wherein the second resonant antenna circuit is located at the opposite end of the elongated housing.

21. The extension antenna of claim 20, wherein the first and second resonant antenna circuits include ferrite antennas.

22. The extension antenna of claim 21, wherein the first and second resonant antenna circuits include the identical same inductors, the identical capacitors, and the identical inductor and capacitor wiring configuration.

23. The extension antenna of claim 22, wherein:
the first and second resonant antenna circuits include antennas that have a circular cross-section geometry; and
the elongated housing has a circular cross-section geometry.

24. A radio frequency identification reader assembly, comprising:
a portable reader, including:
reader circuitry configured to generate an activation signal;
a first ferrite antenna, where the first ferrite antenna is electrically connected to the reader circuitry; and
a reader housing containing the reader circuitry and the first ferrite antenna;
an extension antenna including:
an elongated housing;
a second ferrite antenna located at one end of the housing; and
a third ferrite antenna located at the opposite end of the housing, where the second ferrite antenna is electrically connected to the third ferrite antenna; and
a mechanical coupler configured to fix one end of the elongated housing of the extension antenna to the housing of the portable reader, wherein the first ferrite antenna and second ferrite antenna are spaced no more than 2 cm apart, are axially aligned, and inductively coupled when the extension antenna is fixed to the housing of the portable reader by the mechanical coupler.

25. The radio frequency identification reader assembly of claim 24, wherein the first ferrite antenna and the second ferrite antenna have the same physical, mechanical, and electrical properties.

26. The radio frequency identification reader assembly of claim 24, wherein the mechanical coupler includes a connective sleeve into which the extension antenna can be inserted.

27. The radio frequency identification reader assembly of claim 26, wherein the mechanical coupler includes a mechanism for physically securing the mechanical coupler around the housing of the portable reader.

* * * * *

UNITED STATES PATENT AND TRADEMARK OFFICE
CERTIFICATE OF CORRECTION

| | | |
|---|---|---|
| PATENT NO. | : 7,764,177 B2 | |
| APPLICATION NO. | : 11/825970 | |
| DATED | : July 27, 2010 | |
| INVENTOR(S) | : Robert Stewart | |

It is certified that error appears in the above-identified patent and that said Letters Patent is hereby corrected as shown below:

In column 11, line 43, of claim 22, after identical delete "same".

Signed and Sealed this
Eleventh Day of January, 2011

David J. Kappos
*Director of the United States Patent and Trademark Office*